Oct. 21, 1924.

N. M. BARKER

GASKET FOR TRAIN PIPE CONNECTERS

Filed Dec. 10, 1920

1,512,572

INVENTOR
Norman M. Barker
BY Baker & Macklin,
ATTORNEYS

Patented Oct. 21, 1924.

1,512,572

UNITED STATES PATENT OFFICE.

NORMAN M. BARKER, OF WEST PARK, OHIO, ASSIGNOR, BY MESNE ASSIGNMENTS, TO THE AMERICAN AUTOMATIC CONNECTOR COMPANY, OF WYOMING, DELAWARE, A CORPORATION OF DELAWARE.

GASKET FOR TRAIN-PIPE CONNECTERS.

Application filed December 10, 1920. Serial No. 429,693.

*To all whom it may concern:*

Be it known that I, NORMAN M. BARKER, a citizen of the United States, residing at West Park, in the county of Cuyahoga and State of Ohio, have invented a certain new and useful Improvement in Gaskets for Train-Pipe Connecters, of which the following is a full, clear, and exact description, reference being had to the accompanying drawings.

This invention relates to gaskets for pipe connections and particularly to a construction of gasket adapted for use with train pipe couplings. One of the specific objects of the invention is to provide suitable gasket means which will prevent fluid pressure in a pipe from forcing the meeting edges of a gasket apart to allow the fluid to escape. An additional object of the invention is to provide means which will tend to strengthen the gasket and to give it a longer life without greatly increasing the expense of installation.

Figure 1:
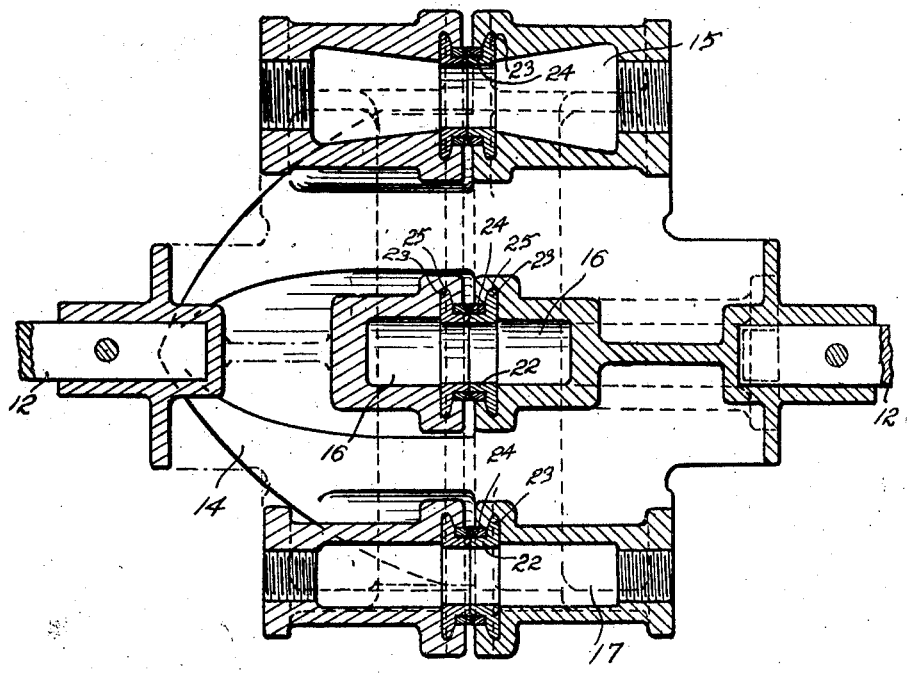
Figure 2:
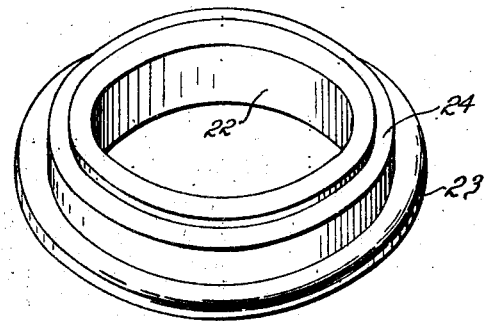

Further objects will be apparent from the following description taken in connection with the accompanying drawings, wherein Fig. 1 is a cross section of an automatic train pipe connector showing a plurality of gaskets made according to my invention; Fig. 2 is a perspective view of my improved gasket.

I have shown my invention in connection with an automatic connecter illustrated in Patent No. 1,347,986 issued July 27th, 1920, to Martin A. Barber. Briefly the connecter shown in this patent embodies a bracket which depends from a car coupler and is provided with a seat for a universal joint through which a shank 12 may extend. The connecter head 14 is disposed at the forward end of the shank and as illustrated in Fig. 1 is provided with train pipe orifices 15, 16 and 17 respectively.

My improved gasket may comprise a cylindrical portion 22 which has a flange 23 at one end. Upon the cylindrical portion I provide a reinforcing ring 24, which may be a metal ring which has a snug fit. As will be noted from the drawing, the ring may be of less length than the portion upon which it is fitted, to thus present a portion of the gasket for mating with a similar portion on another gasket. The train pipe orifices 15, 16 and 17 are recessed to receive the flanges on the gaskets.

When two gaskets are brought together, as shown in Fig. 1, the resilient portions first engage and are compressed as the connected pipes are urged together and then the metal reinforcing rings come into abutting contact. These metal rings bear at their inner ends against the flanges of the elastic gaskets, which thus provide yielding seats for the rings, allowing them to give back when the connecters are coupled. The rubber members make a tight abutting joint, while the metal members prevent their blowing out.

In the usual gasket there is a tendency for the gasket to blow outwardly, due to the high pressure within the pipe and the comparative yielding qualities of the gasket. By surrounding the gasket with reinforcing means, as shown, all tendency to blow out at the side is eliminated.

In a gasket of my improved type, the resilient material need not be as heavy as is customary since I do not depend upon this resilient material to take up the fluid pressure. By decreasing the size I save material and consequently produce a cheaper gasket and at the same time secure greater efficiency.

Having thus described my invention what I claim as new and desire to secure by Letters Patent is:—

1. In a train pipe coupling, the combination with a pair of coupling heads adapted to abut and having registering orifices, gaskets mounted in the heads at the orifices, each gasket having a tubular portion, a metal ring surrounding it and slidable in the head and having an exposed edge so positioned that when the gaskets abut and are forced inwardly the rings engage each other.

2. In a train pipe coupling, a pair of coupling heads having orifices adapted to register, each head having an enlarged space within the head about the orifice, flanged gaskets having their flanges seated in such an enlarged space, and their tubular portions extending beyond the face of the head, and metal rings surrounding the said tubular portions of the gaskets and bearing against the flange portions and slidable in the heads, and having their free edges a short distance back from the edge of the gasket when the heads are uncoupled.

In testimony whereof, I hereunto affix my signature.

NORMAN M. BARKER.